United States Patent [19]

Fuss et al.

[11] Patent Number: 5,553,965
[45] Date of Patent: Sep. 10, 1996

[54] CONSTRAINT SYSTEM FOR PARALLEL CANTILEVER SHAFTS

[75] Inventors: Fred M. Fuss, Hamlin; John A. Mesolella, Rochester, both of N.Y.

[73] Assignee: Eastman Kodak Company, Rochester, N.Y.

[21] Appl. No.: 388,015

[22] Filed: Feb. 14, 1995

[51] Int. Cl.⁶ .................................................. F16C 27/04
[52] U.S. Cl. ...................... 403/291; 403/227; 403/220; 403/389; 384/536; 384/582
[58] Field of Search ...................... 403/291, 220, 403/227, 226, 225, 362, 320, 389; 384/536, 583

[56] References Cited

U.S. PATENT DOCUMENTS

| | | | |
|---|---|---|---|
| 186,109 | 1/1877 | Clark | 83/670 |
| 3,827,321 | 8/1974 | Bley | 83/117 |
| 3,861,815 | 1/1975 | Landaeus | 403/227 X |
| 4,485,710 | 12/1984 | Schlisio et al. | 83/346 |
| 4,770,078 | 9/1988 | Gautier | 83/344 |
| 4,900,165 | 2/1990 | Kun et al. | 384/582 X |
| 5,033,875 | 7/1991 | Moulinet | 384/536 |
| 5,407,282 | 4/1995 | Bade et al. | 384/582 X |
| 5,481,142 | 1/1996 | James | 310/51 |

FOREIGN PATENT DOCUMENTS 2315367  1/1977  France .

*Primary Examiner*—Anthony Knight
*Attorney, Agent, or Firm*—Clyde E. Bailey, Sr.

[57] ABSTRACT

Cantilever shafts (34, 40) support bearing assemblies (54, 56) over which is mounted a tuned compliance or constraint member (92) including flexure members (102, 104, 106) which minimize deflection of the shafts and improve operation of associated rotary tools (18, 20). An improved lock nut (70–86) permits precise installation of the bearing assemblies.

21 Claims, 4 Drawing Sheets

CONSTRAINT SYSTEM FOR PARALLEL CANTILEVER SHAFTS

TECHNICAL FIELD

The invention concerns improvements to rotary equipment such as punchers, slitters, embossers, sealers and the like in which cooperating rotating tools are mounted on cantilever shafts for acting on a work piece that passes between the rotating tools. More particularly, the invention relates to a constraint system for minimizing deflection of such cantilever shafts, without providing an over constraint, which could result in damage to components such as tools, shafts and bearings.

BACKGROUND ART

In apparatus such as rotary punchers, slitters, embossers, sealers and the like, which involve the use of a pair of cooperating rotary tools, the tools frequently have been mounted on outboard ends of driven cantilever shafts, to facilitate thread up of the work piece, maintenance of the equipment and the like. A problem with such apparatus has been that the ends of the cantilever shafts tend to deflect or flex slightly. Such deflection can lead to premature wear of the tools: and to incomplete or irregular punching, slitting, embossing or sealing. These problems in turn can require frequent shut down of the apparatus for adjustment, replacement of worn and broken parts and other repairs made necessary by such deflection of the cantilever shafts.

One solution attempted for such problems has been to provide, rigidly attached to the frame of the apparatus, an additional rotary support for the free end of each cantilever shaft. Aside from the difficulty of threading up and maintaining such an apparatus, the additional support may over constrain the shaft: so that, errors in alignment can cause high stresses on shafts, bearings and tools, leading ultimately to failures. Another solution is described in U.S. Pat. No. 186,109 which shows half journal bearings mounted inboard of the tools from the ends of the cantilever shafts. This arrangement over constrains the shafts and would be expected to lead to early failure of the half journals. U.S. Pat. No. 4,485,710 shows a paper cutting machine in which movement of non-cantilever shafts in low precision bearings is minimized by a bearing unit supported between a pair of non-cantilever shafts. U.S. Pat. No. 4,770,078 shows a cutting and scoring apparatus in which tools mounted on cantilever shafts are prevented from moving by rollers mounted in the frame of the apparatus. This arrangement also results in over constraint of the shafts and tools.

Thus, a need has existed for a solution to the problem of controlling movement of tools mounted on cantilever shafts, without over constraining the shafts, tools or supporting bearings. A need has also existed for a solution to the problem of controlling run-out of the supporting bearings, which can contribute to movement of the tools.

SUMMARY OF THE INVENTION

The primary object of the invention is to provide a technique for minimizing movement of rotary tools mounted on cantilever shafts, but without providing an over constraint.

Another objective is to provide such a technique without appreciably reducing the harmonic frequencies of the associated apparatus.

Still another objective of the invention is to provide such a technique which can accommodate a substantial degree of runout of a pair of cantilever shafts.

These objectives are given only by way of illustrative examples; thus other desirable objectives and advantages inherently achieved by the invention may occur or become apparent to those skilled in the art. The scope of the invention is to be limited only by the appended claims.

The invention is particularly useful in an apparatus including a pair of parallel shafts having cantilever portions and a pair of cooperating tools each mounted on a respective cantilever portion, the shafts being mounted for rotation in the apparatus during use of the tools. The tools may be rotary punchers, slitters, embossers, sealers and the like. In accordance with the invention, such apparatus is improved by including first and second bearings each mounted on a respective cantilever portion outboard of a respective one of the cooperating tools. Uniquely in accordance with the invention, a tuned compliance or constraint member is supported by the first and second bearings, the constraint member including a first body portion with a first bore within which the first bearing is located, a second body portion with a second bore within which the second bearing is located and at least one flexure extended between the first and second body portions, the flexure being effective for limiting deflection of the cantilever portions. The first and second bores may be through bores or blind bores. The flexure permits limited movement of the cantilever portions, without providing an over constraint which could lead to damage to bearings, shafts and tools. By appropriately selecting the geometry and material of the flexure, the constraint member, in effect, can be tuned to provide the desired flexibility or compliance for a particular application.

In one embodiment, the flexure has a major width dimension measured essentially parallel to axes of rotation of the shafts, a minor width dimension measured essentially transverse to the axes of the shafts and a length between the first and second body portions. There may be several flexures, a central flexure located in a plane containing axes of rotation of the cantilever shafts and side flexures on opposite sides of the central flexure. The side flexures may be angled toward each other. Preferably, the flexure(s) and the body portions are formed integrally. To ensure that the constraint member does not provide an over constraint, the constraint member preferably is supported substantially only by the first and second bearings. That is, there is no rigid structural member extending directly from the constraint member to ground or the frame of the overall apparatus. In instances where further limiting movement of the constraint member is desired, the invention may include means for limiting radial movement of the constraint member. Each of the parallel cantilever shafts may comprise an inboard cantilever portion which supports a respective one of the tools and a separate, outboard cantilever portion which is supported by the respective tool, each bearing being mounted on a respective separate, outboard cantilever portion.

To enable the positions of the bearings to be adjusted precisely on their respective shafts, a lock nut may be threaded onto an outboard end of each cantilever portion and engaged with a respective bearing. The lock nut may include a body portion with a central threaded bore, a plurality of circumferentially spaced, threaded through bores essentially parallel to an axis of rotation of the lock nut: and a corresponding plurality of screws in the threaded bores, at least one of the screws being adjustably engaged with the respective bearing. Brass contact plugs may be provided between the screws and the bearings. Since the bearings each have an inner race and an outer race, the lock nut preferably engages the inner race. The lock nut also may include a further plurality of circumferentially spaced, threaded through bores extended radially toward the axis of rotation of the lock nut; a corresponding further plurality of radially movable, threaded shoes; and a corresponding further plurality screws in the further plurality of through bores for pressing the shoes against the cantilever portion. The invention may include a pair of housings, one housing surrounding each bearing, each housing having a circumferentially and radially extending flange for engaging the constraint member around a respective one of the first and second bores, there being substantial radial clearance between the housings and the respective bores, and the constraint member being fastened to the radially extending flange. The lock nut may be used to adjust the positions of the housings to greatly reduce radial and axial runout and to ensure ready installation of the constraint member.

The invention provides numerous significant advantages. Because of the presence of the constraint member, the stiffness or rigidity of the rotary system is increased substantially, which minimizes the relative movement of the tools and leads to improved punching, slitting, embossing, sealing and the like. Tool wear is more uniform along the axis of rotation of the tool. The tools also are able to act effectively on materials having higher shear strengths, since movement apart by the tools is greatly reduced. Higher speeds of operation frequently are achievable. The constraint member acts as a damper for the independent vibrations of the cantilever shafts. By proper selection of the material, geometry and number of the flexures, the stiffness or compliance of the constraint member can be tuned to each particular application. Existing apparatus may be modified readily by installing the constraint system outboard of tools already mounted on cantilever shafts.

BRIEF DESCRIPTION OF THE DRAWINGS

The foregoing and other objectives, features and advantages of the invention will be apparent from the following more particular description of the invention, as illustrated in the accompanying drawings.

DESCRIPTION OF THE PREFERRED EMBODIMENTS

Figure 1:
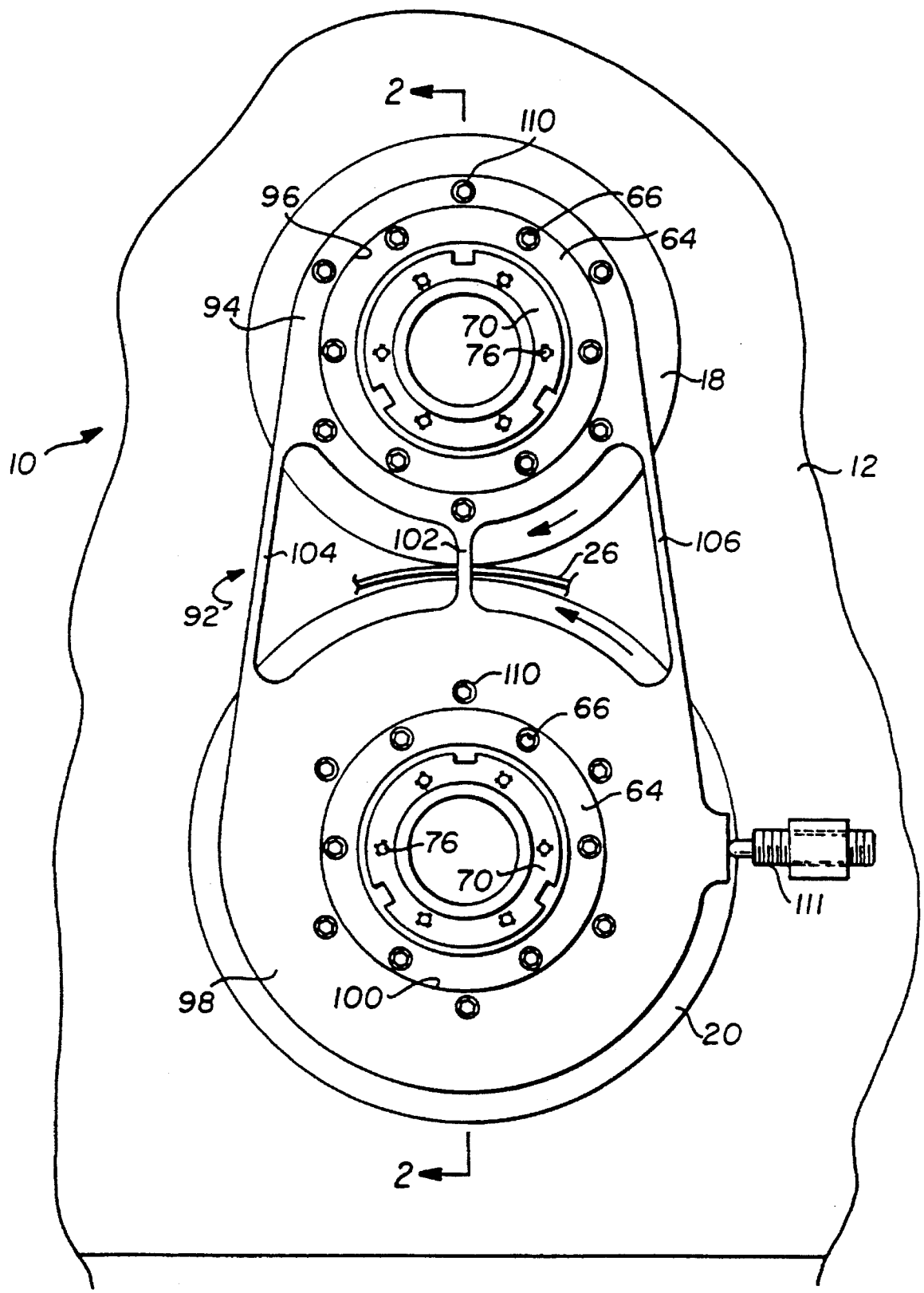
FIG. 1 shows a front elevation view of an apparatus embodying the invention.

The following is a detailed description of the invention, reference being made to the drawings in which the same reference numerals identify the same elements of structure in each of the several Figures.

Figure 2:
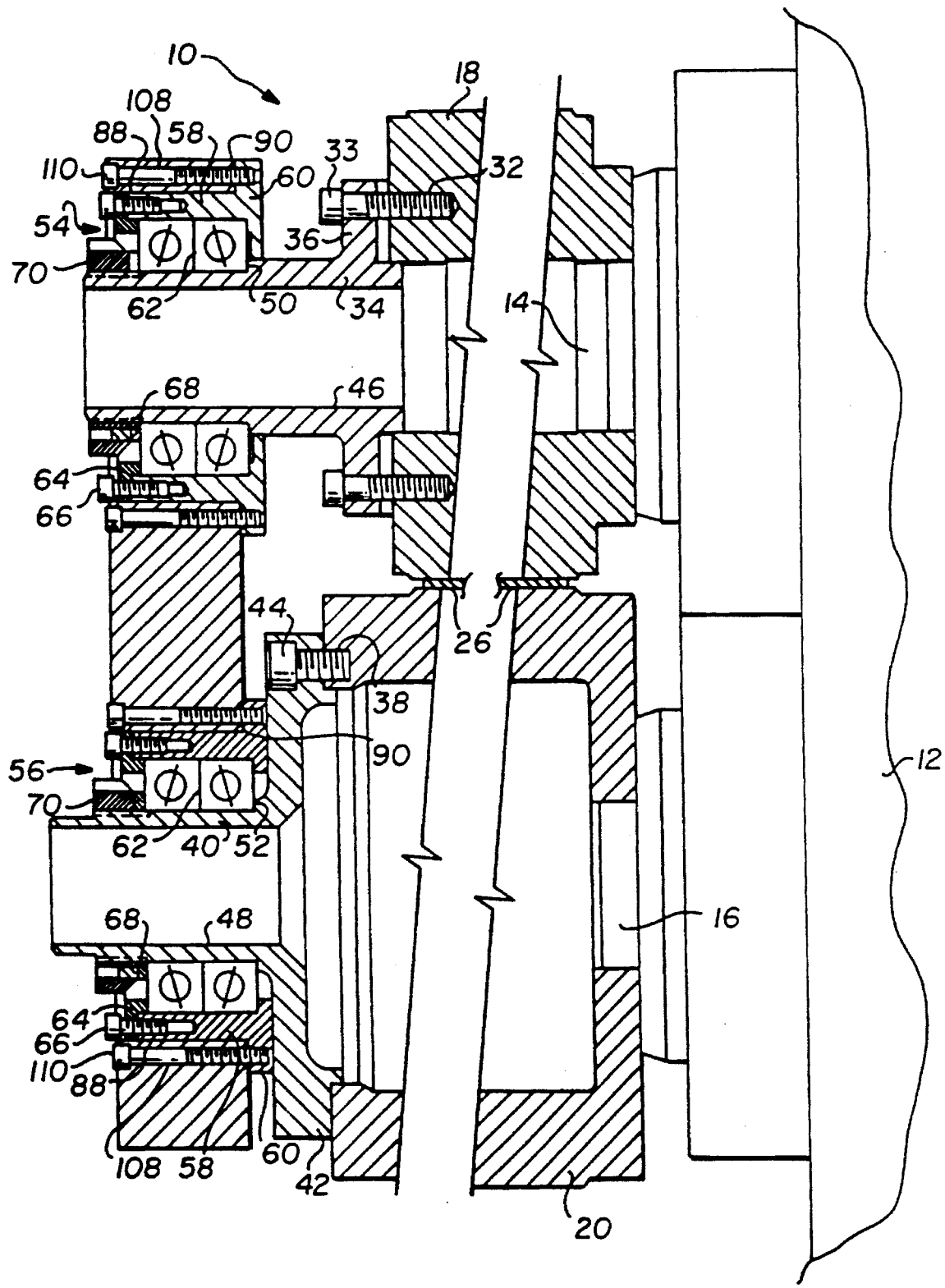
FIG. 2 shows a sectional view taken along line 2—2 of FIG. 1.
Figure 3:
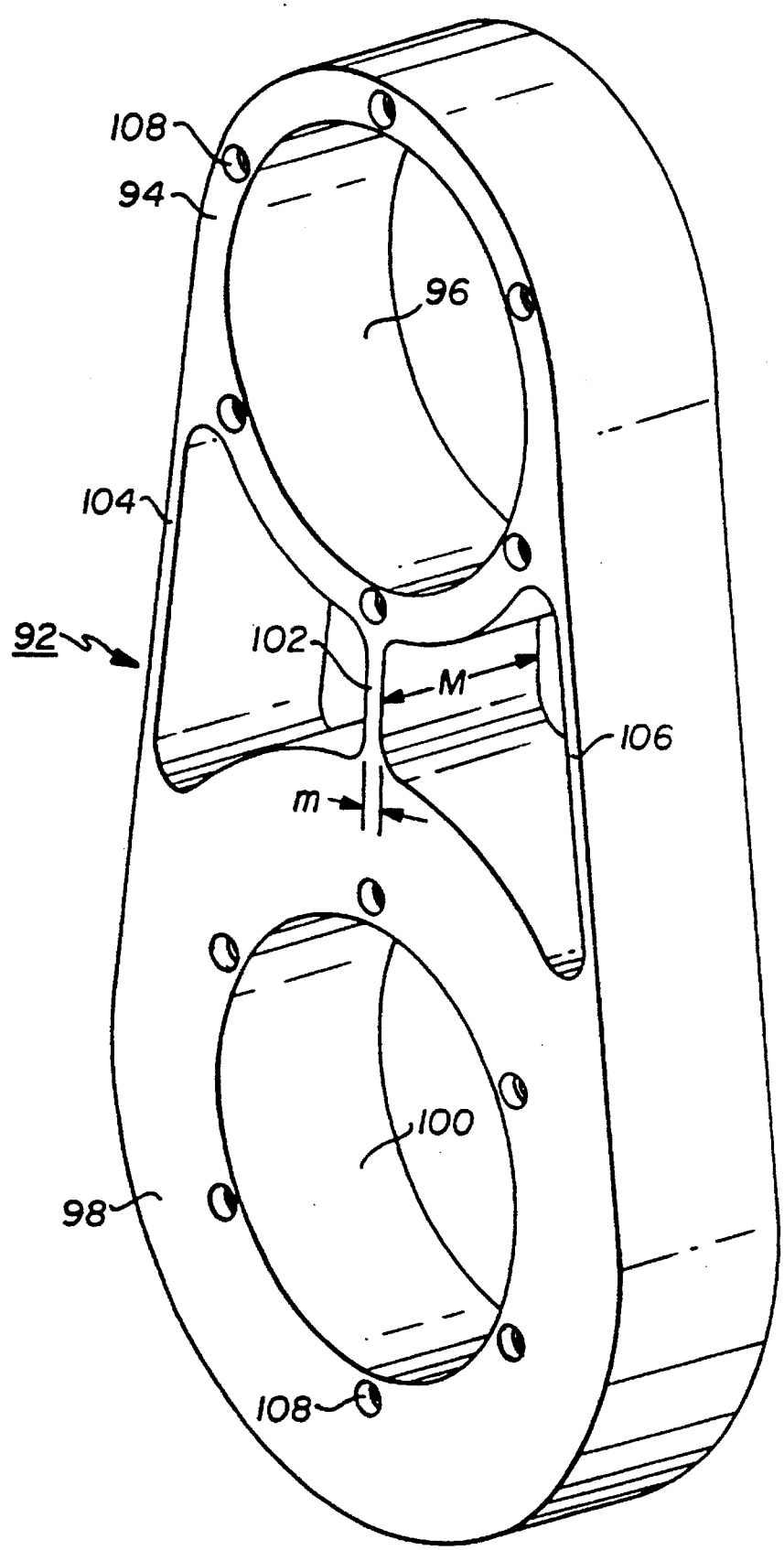
FIG. 3 shows a perspective view of a constraint member.

Referring to FIGS. 1 to 3, the invention is particularly useful in an apparatus 10 which includes a drive module 12 from which extends a pair of cantilever shafts 14, 16 which are rotated by module 12 during old ration. In the illustrated apparatus, a rotary tool 18 is fixedly mounted for rotation with shaft 14 and a cooperating rotary tool 20 is fixedly mounted for rotation with shaft 16. Those skilled in the art will understand that the invention may be applied to rotary equipment which includes a wide variety of rotary, cooperating tools, such as those used in punchers, slitters, embossers, sealers, printers, calendering rolls, web choppers and the like. In the familiar manner, a work piece 26, such as an elongated strip or strips of material, is drawn between the rotating tools to be punched, slit, embossed, sealed or to undergo whatever transformation can be completed with such rotary tools.

Rotary tool 18 is provided with a circumferential array of threaded holes 32. A cantilever shaft extension 34, having a circumferentially and radially extending flange 36, is mounted on tool 18 by screw 33 extended into hole 32. Similarly, rotary tool 20 is provided with a circumferential array of tapped holes 38. A cantilever shaft extension 40, having a radially extending flange 42, is mounted to tool 20 by a plurality of screws 44. Alternatively, shafts 14, 16 may be enlarged and extended through tools 18, 20, respectively. To minimize the mass and maximize the resonant frequency of the overall assembly, shaft extensions 34. 40 preferably are provided with respective central bores 46, 48. Shaft extensions 34, 40 include respective shoulders 50, 52. Mounted against the shoulders are bearing assemblies 54, 56, each of which includes a cylindrical housing 58 having a radially and circumferentially extending flange 60 and surrounding a duplex bearing 62. Assemblies 54, 56 are fitted onto the shaft extensions against shoulders 50, 52. A retainer ring 64 is mounted into each housing 58 into contact with the outer race of bearing 62. A plurality of screws 66 secure each ring 64 to its respective housing 58. A hardened washer 68 is positioned on each shaft extension against the inner race of bearing 62. A lock nut 70 is threaded onto the end of each shaft extension and into engagement with washer 68.

Figure 4:
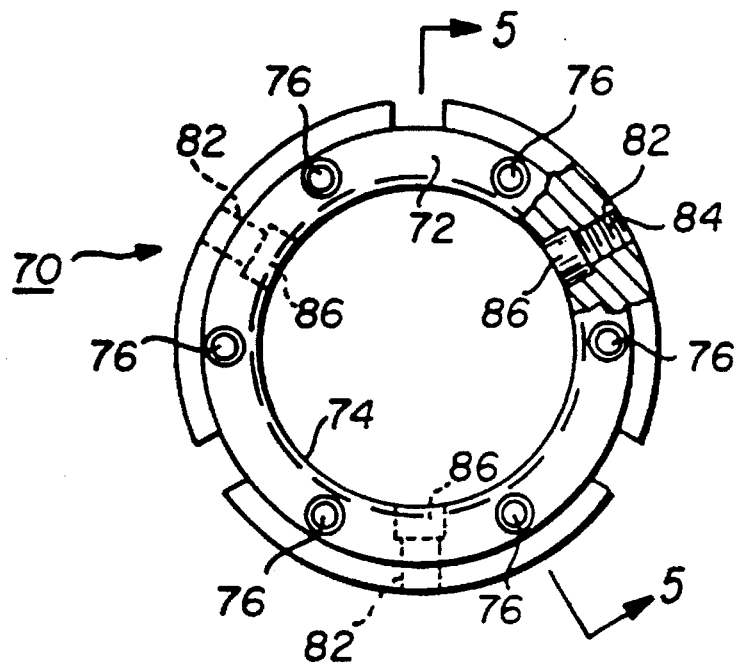
FIG. 4 shows a plan view of a lock nut.
Figure 5:
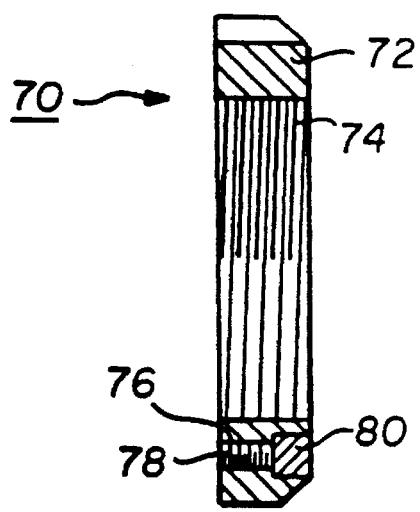
FIG. 5 shows a sectional view along line 5—5 of FIG. 4.

FIGS. 4 and 5 illustrate the features of lock nut 70. An annular body portion 72 is provided with a central threaded bore 74. Surrounding bore 74 are a plurality circumferentially spaced, threaded through bores 76, each bore 76 extending essentially parallel to the axis of rotation of the nut. In each bore 76 is located a screw 78 which bears upon a metal plug 80 positioned in an unthreaded end portion of bore 76. Preferably, plug 80 is made from a material, such as brass, which is softer than screw 78 and washer 68. At initial installation of lock nut 70, screws 78 are not tightened against plugs 80. Also surrounding bore 74 is a further, conventional plurality of circumferentially spaced, threaded through bores 82, each bore extending essentially radially toward the axis of rotation of the nut. In each bore 82 is located a screw 84 which bears upon a threaded metal shoe 86. Preferably, shoe 86 is made from a material, such as brass, which is softer than the material of shaft extensions 34, 40. After the lock nut has been torqued to the necessary preload, screws 84 are tightened against shoes 86 in the familiar manner to prevent the nut from backing off.

After bearing assemblies 54, 56 have been installed and lock nuts 70 have been torqued to the preload required by the bearing manufacturer, the radial runout of each bearing assembly is measured against an outer cylindrical surface 88 of each housing 58; and the axial runout of each bearing assembly is measured against a radially extended surface 90 of each flange 60. Potential causes for such axial and radial runout can include preload forces of the lock nut, lack of squareness between the faces of the lock nut and the axis of rotation of the bearings and similar factors. In an actual application for rotary tools of the type illustrated, the radial and axial runouts at this point during assembly have been measured in the range of 0.0001 to 0.0002 inch (0.0025 to 0.0050 mm). To reduce this amount of runout, screws 78 were tightened against plugs 80. Those skilled in the art will appreciate that pressure from plugs 80 against washer 68 will cause slight changes in geometry, such as very small deflection of shaft extensions 34, 40, which can be adjusted to reduce the amount of runout measured. In the same actual application, use of the lock nut enabled radial and axial runout to be reduced by about a factor of ten, to less than 0.000040 inch (0.001 mm). In this application, the lock nut had an outer diameter of about 2.25 inch (57.2 mm) and an inner diameter of about 1.5 inch (38.1 mm), with bores 76 set 60° apart. Screws 78 had a diameter of about 0.164 inch (4.17 mm); and plugs 80, a diameter of about 0.188 inch (4.78 mm).

Once lock nuts 70 have been adjusted to produce the desired runout, a constraint member 92 of the invention is installed. As shown in FIG. 3, constraint member 92 comprises an upper, cylindrical body portion 94 having a through bore 96 and a lower cylindrical body portion 98 having a through bore 100. Bores 96 and 100 are sized to have a substantial radial clearance of about 0.002 inch (0.051 mm) to outer cylindrical surfaces 88 of bearing housings 58. At least one flexure 102 is extended between body portions 94, 98, in the illustrated embodiment essentially in a plane containing the axes of bores 96, 100. Flexure 102 has a major width dimension M measured essentially parallel to the axes of bores 96, 100 and a minor width dimension m measure essentially transverse to the axes of the bores. A pair of side flexures 104, 106 may be positioned on either side of central flexure 102. Flexures 104, 106 may be angled toward each other, as illustrated, to ease access to the working nip between tools 18, 20.

Those skilled in the art will appreciate, however, that flexures 102, 104, 106 are not limited in geometry and location to the configuration of the illustrated embodiment. The geometry and material of the flexures may be chosen as necessary to enable member 92 to serve as a tuned compliance between the cantilever shafts, as suitable for a particular application. The flexures may be designed to produce a desired spring rate in the direction(s) most suitable for a particular rotary tool pair, to withstand the radial and axial run-out forces expected for the particular application. Thus, run-out motion may be limited in accordance with our invention, without adding excessive strain to the shafts or excessive, damaging loads to bearings, tools, cantilever shafts or shaft extensions. Those skilled in the art accordingly will appreciate that the flexures may have various cross sections, such as square, round, oval and the like, or may be built up from several leaves, without departing from the scope of the invention. As illustrated, constraint member 92 is formed integrally of body portions 94, 98 and flexures 102–106; however, those skilled in the art will appreciate that an assembly of separate parts also may be used. To minimize the weight of the constraint member and to more closely match thermal expansion characteristics of the remainder of the assembly, titanium has been found to be a suitable material.

Constraint member 92 is installed by slipping bores 96, 100 over surfaces 88 of the bearing housings until radial surfaces 90 are contacted. Surrounding each bore is a circumferentially extending array of through bores 108 through which a corresponding plurality of screws 110 extend to engage a corresponding plurality of tapped holes in flanges 60. Sufficient clearance is provided between bores 108 and screws 110 for ease of installation. In some applications, slight movement of constraint member will be observed. Radial movement may be limited, if desired, by means such as a ball and spring plunger 111 installed next to die tool 20, as illustrated schematically in FIG. 1.

A constraint member having the illustrated geometry, coupled with bearing assemblies and lock nuts of the types previously described, was effective to reduce radial and axial runout of a tool pair from a range of 0.000460 to 0.000480 inch (0.0117 to 0.0122 mm), to a greatly improved range of 0.000090 to 0.000115 inch (0.0023 to 0.0029 mm). Consider the case with a Y-axis transverse to the axes of rotation of the tools, an X-axis transverse to the same axes; and a Z-axis parallel to the same axes. In general, constraint systems according to the invention are effective to limit movement of the tools in the Y direction, meaning that good engagement is maintained with the work piece. Some benefit also is realized in the X direction and, to a lesser extent, in the Z direction. Should additional stiffness in the X direction be desired, limited stiffness external braces can be added.

Parts List

10 . . . apparatus embodying the invention
12 . . . drive module
14 . . . cantilever shaft
16 . . . cantilever shaft
18 . . . rotary tool
20 . . . rotary tool
26 . . . work piece, length of photographic film
32 . . . threaded hole
33 . . . screw
34 . . . cantilever shaft extension
36 . . . circumferentially and radially extending flange on 34
38 . . . tapped hole
40 . . . cantilever shaft extension
42 . . . circumferentially and radially extending flange on 40
44 . . . screw
46 . . . central bore in 34
48 . . . central bore in 40
50 . . . shoulder on 34
52 . . . shoulder on 40
54 . . . bearing assembly mounted on 34
56 . . . bearing assembly mounted on 40
58 . . . cylindrical housing of 54 or 56
60 . . . radially and circumferentially extending flange on 58
62 . . . duplex bearing within 54 or 56
64 . . . retainer ring for outer race of 62
66 . . . screw
68 . . . hardened washer
70 . . . lock nut
72 . . . annular body portion of 70
74 . . . central threaded bore in 72
76 . . . axially extending, threaded through bore in 72
78 . . . screw
80 . . . brass plug
82 . . . radially extending, threaded through bore in 72
84 . . . screw
86 . . . threaded brass shoe
88 . . . outer cylindrical surface of 58
90 . . . radially extended surface of 60

92 ... constraint member
94 ... upper, cylindrical body portion
96 ... through bore in 94
98 ... lower, cylindrical body portion
100 ... through bore in 98
102 ... flexure
M ... major width dimension of 102
m ... minor width dimension of 102
104 ... side flexure
106 ... side flexure
108 ... through bore in 94 or 98
110 ... screw
111 ... ball and spring plunger While the invention has been shown and described with reference to a particular embodiment thereof, those skilled in the art will understand that other variations in form and detail may be made without departing from the scope and spirit of the invention.

Having thus described the invention in sufficient detail to enable those skilled in the art to make and use it, we claim as new and desire to secure Letters Patent for:

1. In an apparatus including a pair of parallel shafts having cantilever portions and a pair of cooperating tools each associated with a respective cantilever portion, the shafts being mounted for rotation in the apparatus during use of the tools, the improvement comprising:
   first and second bearings each mounted on a respective cantilever portion outboard of a respective one of the cooperating tools; and
   a tuned compliance member supported by the first and second bearings.

2. Apparatus according to claim 1, wherein the tuned compliance member comprises a first body portion with a first bore within which the first bearing is located, a second body portion with a second bore within which the second bearing is located and at least one flexure extended between the first and second body portions, the flexure being effective for limiting deflection of the cantilever portions.

3. Apparatus according to claim 2, wherein the flexure has a major width dimension measured essentially parallel to axes of rotation of the shafts, a minor width dimension measured essentially transverse to the axes of the shafts and a length between the first and second body portions.

4. Apparatus according to claim 3, wherein there are three flexures, a central flexure located in a plane containing axes of rotation of the shafts and two side flexures on opposite sides of the central flexure.

5. Apparatus according to claim 4, wherein the side flexures are angled toward each other.

6. Apparatus according to claim 2, wherein the flexure and the body portions are formed integrally.

7. Apparatus according to claim 2, wherein the first and second bores are through bores.

8. Apparatus according to claim 2, further comprising a pair of housings, one housing surrounding each bearing, each housing having a circumferentially and radially extending flange for engaging the tuned compliance member around a respective one of the first and second bores, there being substantial radial clearance between the housings and the respective bores, and the tuned compliance member being fastened to the radially extending flange.

9. Apparatus according to claim 1, wherein the tuned compliance member is supported substantially only by the first and second bearings.

10. Apparatus according to claim 7, further comprising means for limiting radial movement of the tuned compliance member.

11. Apparatus according to claim 1, wherein each of the parallel shafts comprises an inboard cantilever portion which supports a respective one of the tools and the improvement further comprises a separate, outboard cantilever portion which is supported by the respective tool, each bearing being mounted on a respective separate, outboard cantilever portion.

12. Apparatus according to claim 1, wherein the improvement further comprises:
   a lock nut threaded onto an outboard end of each cantilever portion and engaged with a respective bearing, the lock nut including a plurality of circumferentially spaced, threaded through bores essentially parallel to an axis of rotation of the lock nut; and a corresponding plurality of screws in the threaded bores, at least one of the screws being adjustably engaged with the respective bearing.

13. The apparatus according to claim 12, wherein the bearings each have an inner race and an outer race and the lock nut engages the inner race.

14. The apparatus according to claim 12, further comprising a metal plug between the screw and the respective bearing.

15. The apparatus according to claim 12, wherein the improvement further comprises:
   the lock nut including a further plurality of circumferentially spaced, threaded through bores extended radially toward the axis of rotation of the lock nut; a corresponding further plurality of radially movable, threaded shoes; and a corresponding further plurality screws in the further plurality of through bores for pressing the shoes against the cantilever portion.

16. A tuned compliance member for use in an apparatus including a pair of parallel shafts having cantilever portions and a pair of cooperating tools each associated with a respective cantilever portion, the shafts being mounted for rotation in the apparatus during use of the tools, the tuned compliance member comprising:
   a first body portion with a first bore within which a first bearing may be located on one of the shafts, a second body portion with a second bore within which a second bearing may be located on the other of the shafts, and at least one flexure extended between the first and second body portions, the flexure being effective for limiting deflection of the cantilever portions.

17. Apparatus according to claim 16, wherein the flexure has a major width dimension measured essentially parallel to axes of rotation of the shafts, a minor width dimension measured essentially transverse to the axes of the shafts and a length between the first and second body portions.

18. Apparatus according to claim 17, wherein there are three flexures, a central flexure Located in a plane containing axes of rotation of the shafts and two side flexures on opposite sides of the central flexure.

19. Apparatus according to claim 18, wherein the side flexures are angled toward each other.

20. Apparatus according to claim 16, wherein the flexure and the body portions are formed integrally.

21. Apparatus according to claim 16, wherein the first and second bores are through bores.

* * * * *